Feb. 5, 1929.  1,701,194

F. ROSENSTEIN ET AL

BEVERAGE MAKER AND DISPENSER

Filed March 10, 1928

INVENTOR.
Fritz Rosenstein
and Edward Bendheim
BY
ATTORNEY

Patented Feb. 5, 1929.

1,701,194

UNITED STATES PATENT OFFICE.

FRITZ ROSENSTEIN AND EDWARD BENDHEIM, OF LOS ANGELES, CALIFORNIA.

BEVERAGE MAKER AND DISPENSER.

Application filed March 10, 1928. Serial No. 260,790.

Our invention relates to a vessel for preparing an aromatic beverage from tea leaves or ground coffee by infusion with boiling water and for serving it as desired by the individual using it.

The objects of the invention are to provide a simple, neat and compact container in which a definite quantity of the beverage desired by the user may be made; in which the beverage may be kept hot until used; in which the beverage is always fresh; from which it may be served by the individual user to himself when desired, and to provide a device of this character in which the parts thereof are readily accessible.

Figure 1:
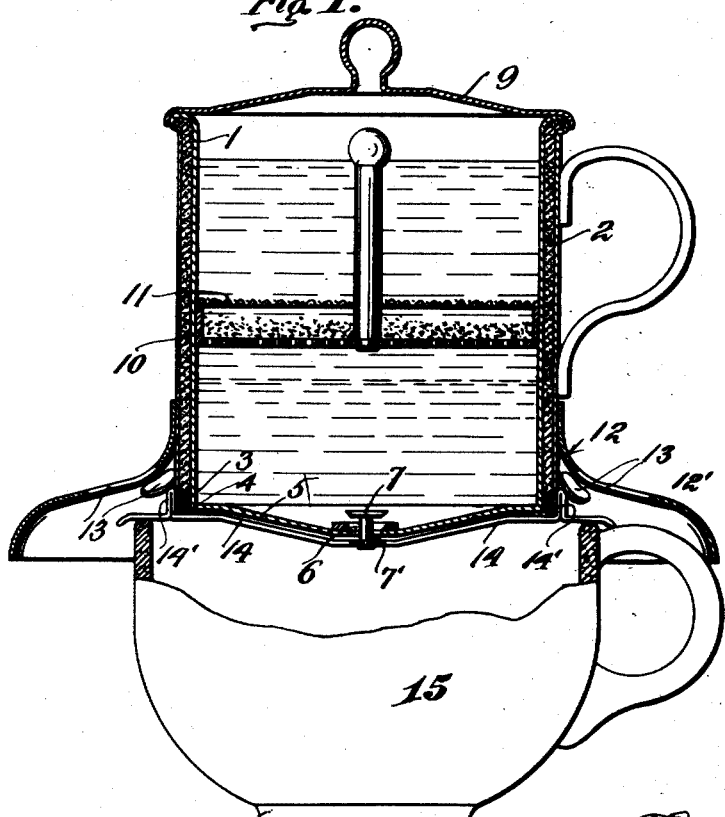
Figure 3:
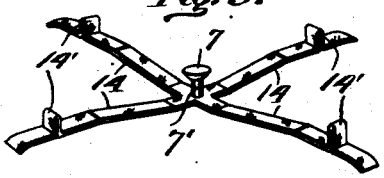
Figure 2:
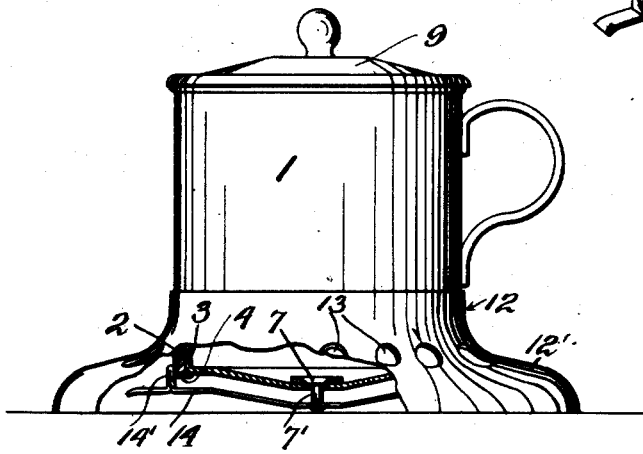

These and other objects are attained by a form of embodiment of the invention illustrated in the accompanying drawings in which Fig. 1 is an elevational section of a device showing our invention, Fig. 2 is an elevation, and Fig. 3 is a perspective detail of the valve operating mechanism.

Similar reference characters in the several views denote similar parts. The invention consists of a container for a beverage, arranged to be set or placed upon a cup and provided with means by which a desired quantity of the liquid in the container may be dispensed into the cup.

In a more specific sense, the invention is shown as consisting of a vessel or container 1, preferably of cylindrical form, and composed of two spaced walls, between which is arranged to be interposed insulating material 2, of any desirable heat non-conducting sort to prevent dissipation of the heat from the liquid to be placed within the container. By means of an annular plug 3, carried in a flanged annulus 4, the insulating material 2 is held in position within the space between the walls of the container.

The bottom 5 of the container 1, centrally thereof is provided a conical opening 6, forming a seat for a valve 7, that constitutes a part of a vertical stem 7' extending centrally through said conical opening 6. A lid or cover 9 is arranged to close the top of the container, within which 8 is arranged to be fastened in any desirable fashion, as by friction, a suitable perforate cup 10 for the substance from which the beverage is to be made, a reticulate cover 11 for said cup being provided to confine the substance within the cup 10 and permit the percolation therethrough of the liquid used in extracting the essence from the substance used in preparing the beverage.

On the lower outside portion of the container 1 is provided a suitable stand 12 by which the container or vessel 1 may be conveniently supported, the diameter of said stand being sufficient to accommodate it to all sizes of cups.

The container 1 is designed to hold a cupful or a quantity in excess, and in order that the user may know how much of the beverage has passed into the cup, the outwardly flowing rim 12' of the stand 12 is provided with sight-holes 13.

Onto the end of said stem 7' of the valve 7 is secured a plurality of arms 14, each provided near the end thereof with an upstanding guide 14' arranged for slidable engagement with the outer wall of the container 1. The arms 14 are arranged to extend beyond the rim or edge of a cup 15, as shown in Fig. 1. Normally the valve 7 is seated, as shown in Fig. 2 and the arms 14 thereof lie in a plane above the bottom of the stand 12, so that they will not contact with a table or other support upon which it is placed. When the beverage is desired by the user the container 1 is placed upon a cup, in manner shown in Fig. 1, and the valve 7 is automatically unseated as the arms 14, to which the valve 7 is secured are caused to move upwardly by the weight of the container. When a sufficient quantity of the beverage has been released, the container 1, is merely removed from the cup, thereby causing the valve 7 automatically to seat.

What we claim is:

1. An individual beverage maker and dispenser comprising an insulated container having an outlet in the bottom thereof, a gravity valve normally closing the outlet from said container, means connected with said valve for supporting the container upon a receptacle and for unseating said valve to cause the contents of the container to pass into a receptacle, and means extending below the bottom of said container and beyond said supporting means for supporting the container when not in use.

2. An individual beverage maker and dispenser comprising an insulated container having an outlet in the bottom thereof, a valve normally closing said outlet, means connected with said valve for supporting the container upon a receptacle and for simultaneously operating said valve to cause the contents of the container to pass into the receptacle, guides on said valve operating means, and a stand on said container and extending below the bottom thereof and beyond the valve operating means, said stand provided with apertures to determine the amount of beverage that has passed into the receptacle.

3. An individual beverage maker and dispenser, comprising an insulated container, having an outlet in the bottom thereof, a valve seated normally in said outlet, and means connected with said valve for automatically unseating said valve and causing the contents of the container to pass into a receptacle when the container is placed upon the receptacle, said valve automatically seating when the container is removed from the receptacle.

In testimony whereof we have set our hands.

FRITZ ROSENSTEIN.
EDWARD BENDHEIM.